Jan. 30, 1951     F. H. OWENS     2,539,521
PROJECTION MACHINE
Filed May 19, 1944     4 Sheets-Sheet 4
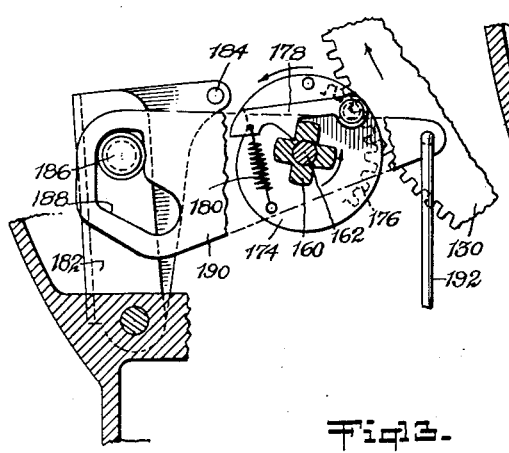
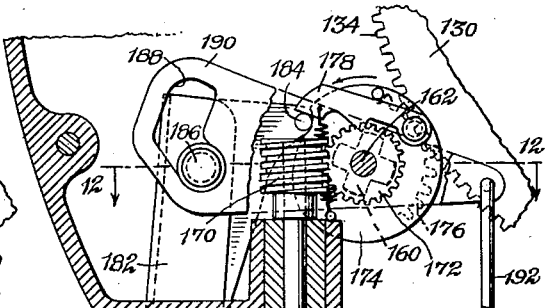
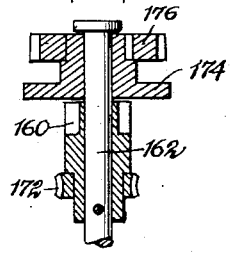
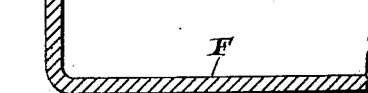
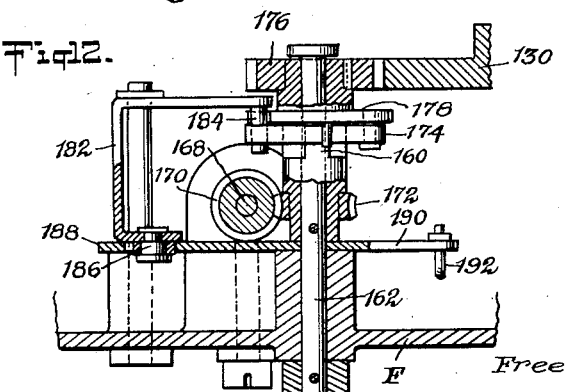
INVENTOR.
Freeman H. Owens
BY
James & Franklin
Attorneys Patented Jan. 30, 1951

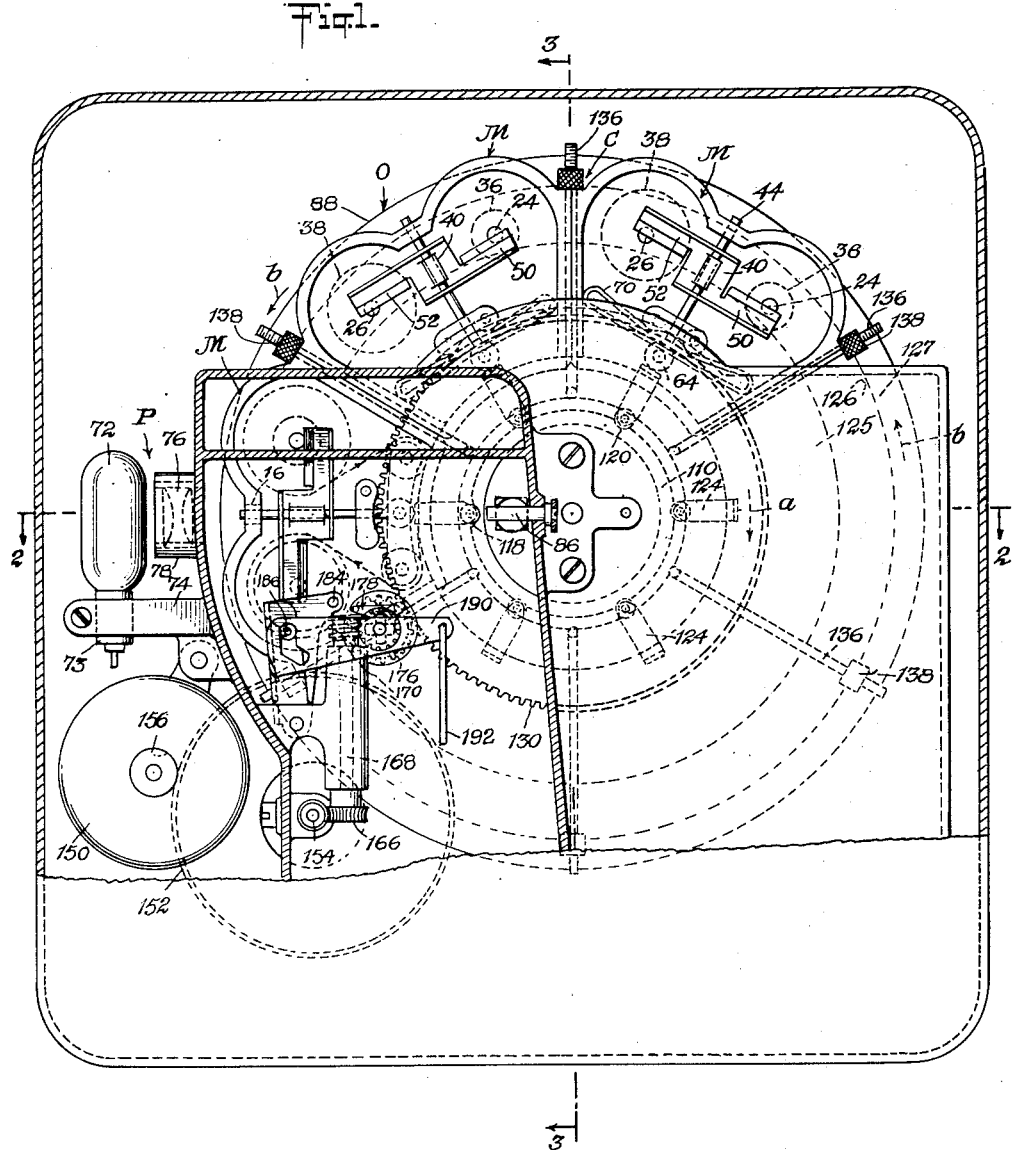

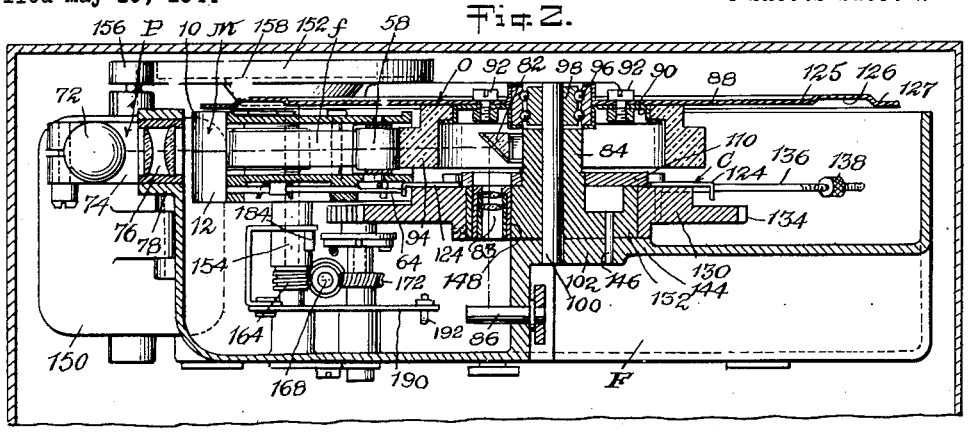
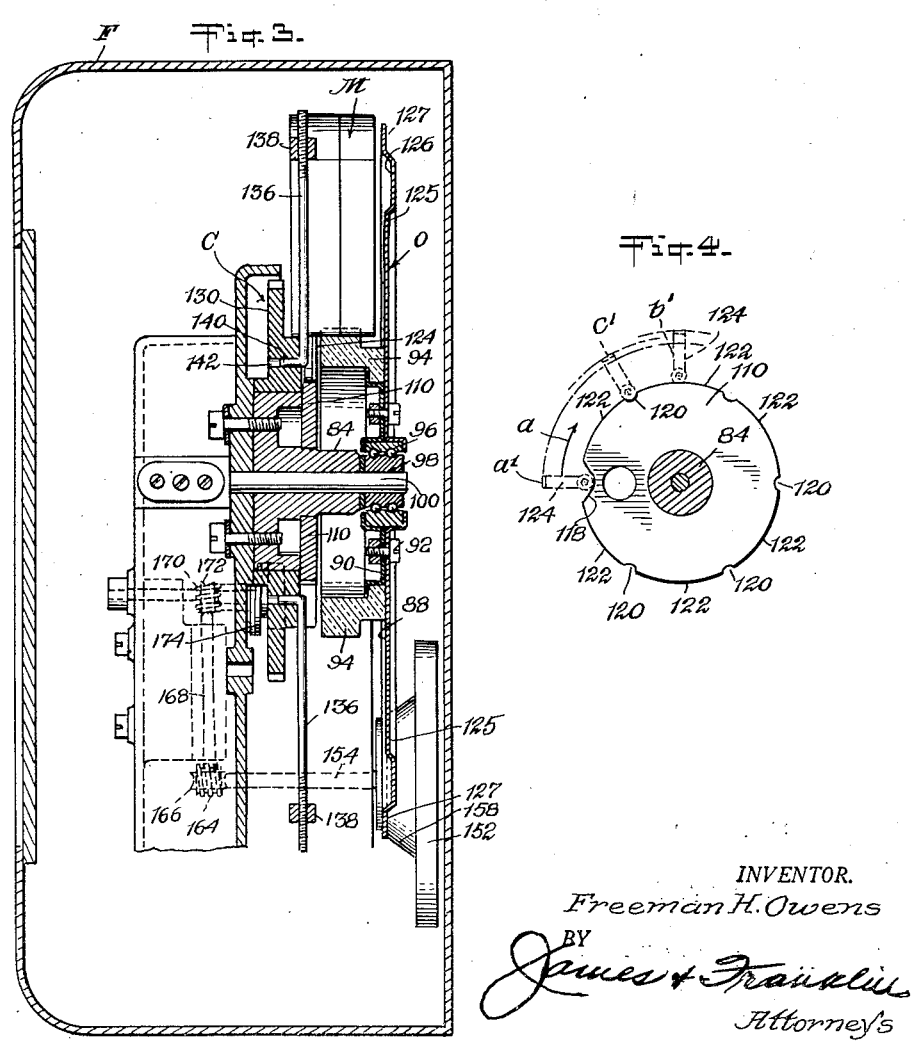

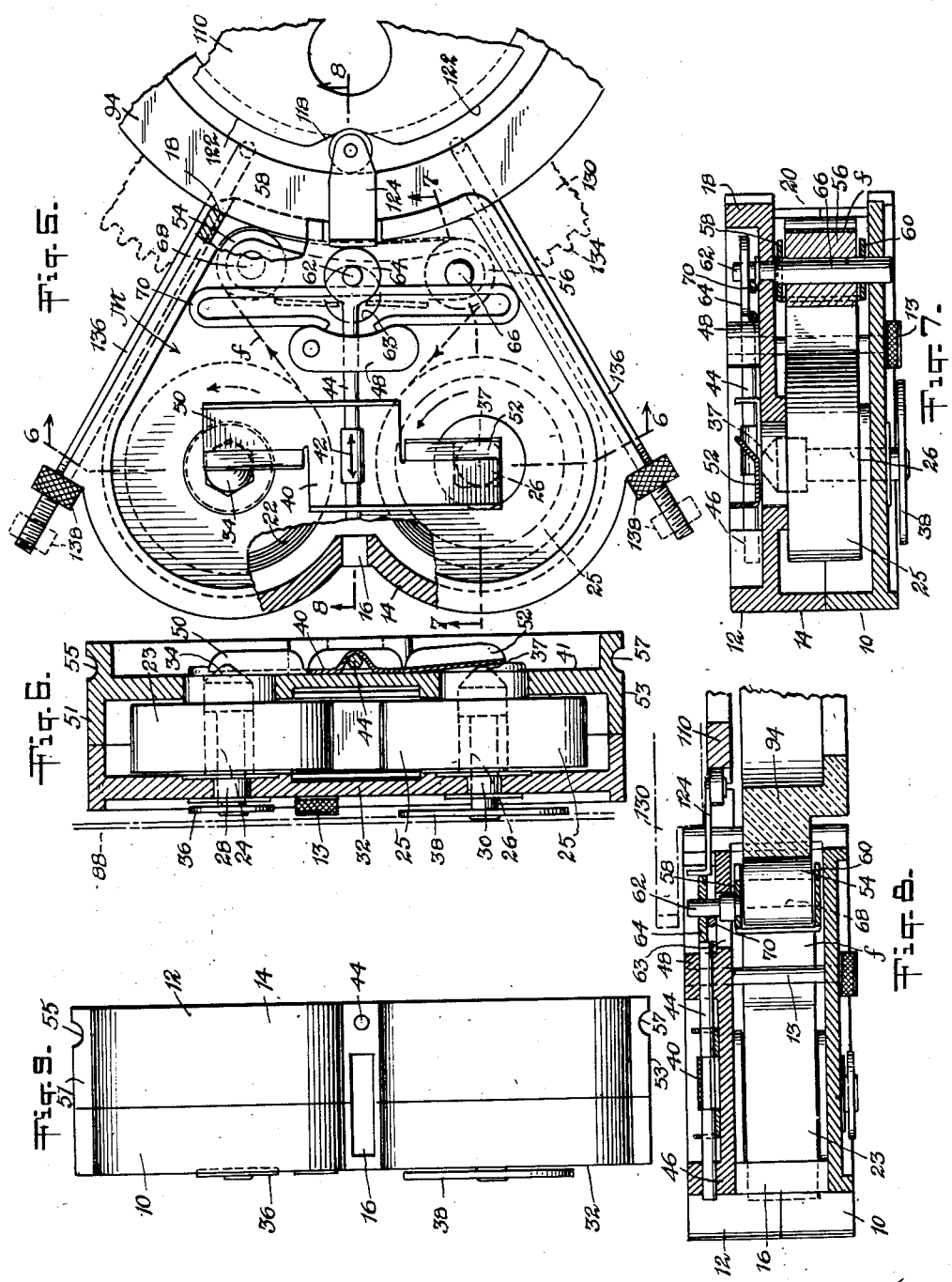

2,539,521

UNITED STATES PATENT OFFICE 2,539,521

PROJECTION MACHINE

Freeman H. Owens, New York, N. Y.

Application May 19, 1944, Serial No. 536,344

25 Claims. (Cl. 242—55)

This invention relates to a film projection machine and more particularly to a film projection machine for the reproduction of sound.

The broad object of my present invention centers about the provision of an improved automatic sound reproducing machine. In such a machine it is intended that any one of a large number of phonograph records may be selected by an operator or user by his dropping a coin into the machine and determining the desired selection. The phonograph records are produced on and reproduced in the machine from a photographic record of film. One or more such records may be carried on a single reel of film which film is housed and contained in a film magazine removably mountable in the machine. From a plurality of such film magazines placed in the machine, any one film record may be selected by the operator for reproduction. Reproduction is effected by optical projection of the photographic-phonograph record on the film. When the operator has indicated his desired selection, the machine automatically operates to move the film magazine into projection position for a projection run and to feed and wind the film in the magazine during a projection run, the film in the magazine being thereafter automatically rewound after a projection run.

In the present application I disclose the general organization of the operated mechanism of this film projection machine. In my copending application Serial No. 536,346, filed May 19, 1944, a divisional of the present application, I disclose and claim the film drive and rewinding mechanism of this projection machine. In another copending application Serial No. 536,345, filed May 19, 1944, now Patent #2,384,637 of September 11, 1945, also a divisional of the present application, there is disclosed and separately claimed the film magazine as employed in this projection machine.

The prime desideratum of the present invention centers about the provision of a novel and unique optical projection machine designed for the optical reproduction of any photographic data on film such as sound records, with particular applicability to the projection of photographic-phonograph records on films. The projection machine is characterized broadly by a novelty in organization and combination which enables the making of an automatic sound reproducer of exceedingly simple construction compared to the many functions and advantages obtained, a construction which may be housed in very small confines so that the reproducer as a whole may be hung, for example, on the wall of a restaurant or inn, one for each separate table booth, and a construction which is characterized by efficiency and ease of operation, capability and facility of ready assembly and repair, durability in use and the possibility of affording any one of a large number of photographic selections to be made by the operator.

To the accomplishment of these objects and such other objects as may hereinafter appear, my invention relates to the film projection machine and the sub-combinations thereof as sought to be defined in the appended claims and as described in the accompanying specification taken together with the following drawings in which:

Fig. 1 is a vertical front elevational view of the operated parts of the projection machine with part of the casing broken away and part of the machine shown in section;

Fig. 2 is a view of Fig. 1 taken in cross-section in the plane of line 2—2 of Fig. 1;

Fig. 3 is a view thereof taken in cross-section in the plane of the line 3—3 of Fig. 1;

Fig. 4 is an explanatory view showing a cam and cam operated parts employed in the projection machine;

Fig. 5 is an elevational view of part of the projection machine drawn to an enlarged scale and featuring one of the film magazines removably mountable in the machine and parts for feeding and driving the film therein;

Fig. 6 is a view of Fig. 5 taken in cross-section along the line 6—6 of Fig. 5;

Fig. 7 is a view thereof taken in cross-section in the broken plane of the line 7—7 of Fig. 5;

Fig. 8 is a view thereof taken in cross-section in the plane of the line 8—8 of Fig. 5;

Fig. 9 is a side view of the magazine shown in Fig. 5;

Fig. 10 is a view drawn to an enlarged scale with parts shown in section of the driving mechanism for the operated parts of the machine showing the parts in one operative position;

Fig. 11 is a view of parts shown in Fig. 10 and showing the same in another operative position;

Fig. 12 is an elevational view of parts shown in Fig. 10; and

Fig. 13 is a detailed view shown in section of parts shown in Fig. 12.

Referring now more in detail to the drawings and having reference first to Fig. 1 thereof, the projection machine of my present invention comprises a machine casing and framework generally designated as F for housing and supporting all of the machine parts, a rotatable magazine carrier generally designated as C for carrying a plurality of film containing magazines M removably receivable on the carrier and arranged circumferentially thereabout, an operating mechanism generally designated as O for feeding, winding and rewinding the film in each of the magazines M, and an optical projection system generally designated as P for projecting and thereby reproducing the record on the film in any selected one of the magazines M.

A brief description of the general operation of the machine will serve to facilitate the description of the component parts thereof. In the exemplification of the invention here disclosed, six film magazines M are mounted on the rotatable magazine carrier C. The film in each film magazine may be made to contain a plurality such as four separate sound records arranged parallelly and longitudinally of the film, thus providing twenty-four different photographic record selections for the machine. (The change from one to another sound record on the given film may be effected by suitable shuttering devices not herein disclosed.) When a selection is made by the operator or user, the carrier C is rotated in the direction indicated by the arrow $a$ (Fig. 1), to move a selected magazine M within the projection system P for a projection run of its film and at the same time to move the other magazines M out of projection position. This rotation of the carrier C is utilized for rewinding the film in all of the magazines M, rewinding being effected by the operating mechanism O. A complete revolution or rotation of the carrier C results whether accomplished incrementally or at one time in the complete rewinding of the film in any given magazine. When a magazine M has been moved by the carrier C to a projection position, the operating mechanism O functions to feed or drive the film in the magazine and to wind the film on the takeup spool thereof. When the motor of the machine is energized, the operating mechanism O is designed to be continuously operated to accomplish these functions of feeding and winding the film when a magazine is in projection position and of rewinding the film when such magazine is moved out of projection position. The carrier C, however, is so operated that it is rotated for a change of film magazine and held in a stationary or dwell position during a projection run of a selected film.

The film magazine M and its operated parts may now be first described, this by reference to Fig. 5 to Fig. 9 of the drawings. This film magazine comprises a casing conveniently made in two mating sections 10 and 12 secured together in any approved way as by means of the thumb screw 13 and the said film magazine is preferably given the sector shaped configuration shown so that the same may fit into a sector portion of the carrier C, a plurality of such magazines being thus capable of being arranged circumferentially about the carrier C in side by side abutting relation, as most clearly shown in Fig. 1 of the drawings. When the casing parts 10 and 12 are assembled, the rear wall 14 thereof has defined centrally therein an orifice or opening 16 for admitting a beam of projected light therethrough to be incident upon and transmitted through a central guided portion of the film $f$ in the magazine. The magazine M is fully open at its front wall 18 which is arcuately formed thus providing the arcuate opening 20.

The magazine casing sections house a film reel 22 having a supply (and rewinding) spool 23 and a takeup or winding spool 25, the spool 23 being mounted on and rotated by a spool spindle 24 and the spool 25 being mounted on and rotated by a spool spindle 26. These spool spindles 24 and 26 are suitably journaled respectively in the flanged sleeves 28 and 30 mounted in what may be considered as the top wall 32 of the magazine.

The spool spindles 24 and 26 are each mounted for axial movement in the spools themselves and in the journaling sleeves 28 and 30. The spool spindles 24 and 26, therefore, have a plunger action within the spools 23 and 25; and each of the spindles is tapered or cammed at one end and provided with a drive element at the other end. Thus the spool spindle 24 is tapered or cammed at 34 at one end and provided at its other end with a drive element in the form of a drive wheel or disc 36, and the spool spindle 26 is tapered or cammed at one end as at 37 and provided at its other end with a drive disc or wheel 38.

The magazine M is also provided with the means for axially moving the film spool spindles and their drive elements. Such means is made to simply comprise a resilient cam plate generally designated as 40 mounted for reciprocation on the bottom wall 41 on the magazine casing in the directions indicated by the double arrow 42 (see Fig. 5), the said cam plate being fixed to and reciprocated by a rod 44 which is movably anchored to the magazine section 12 at one end 46 (Figs. 7 and 8) in a part of the magazine housing and at an intermediate point by means of the bar 48 fixed to or forming part of the housing section 12. The cam plate 40 has two oppositely directed wings 50 and 52 each formed with a flat and an inclined cam face (see particularly Fig. 7), the cam wing 50 cooperating with the spindle end 34 and the cam wing 52 cooperating with the spindle end 37.

In the position shown in Fig. 5 the cam wing 52 has engaged the cam end 37 of the spindle 26 and has moved this spindle axially to the position best shown in Fig. 6, while the cam wing 50 is disengaged from the spindle end 34 permitting this spindle to move to the position best shown in Fig. 6. When the cam plate 40 is moved by its operating rod 44 to the left (viewing Fig. 5), then, as will be further described hereinafter, the cam wing 52 disengages the spindle end 37 while the cam wing 50 engages the spindle end 34 with the result that the spindle 24 is moved axially outwardly while the spindle 26 is permitted to return axially to a new position.

Completing the structure of the magazine per se, there are provided two guide rolls 54 and 56 journaled in the spaced guide plates 58 and 60, the said guide plates being medially connected by means of a stud 62 to a circular boss 64 formed at the inner end of the reciprocating rod 44. The stud 62 is movable in the aperture 63 formed in the magazine section 12 and is limited in its movement in opposite directions by the wall of this aperture. The plates 58 and 60 are secured together at their ends by means of the guide roller pins or spindles 66 and 68 and the pin 66 may be fitted in or anchored to the casing section 10 whereby the plates and the guide rolls may pivot about this pin.

Engaging the connecting stud 62 is a double loop spring 70 anchored medially and opposite the stud 62 to the bar 48. By means of this construction the film guide rolls 54 and 56 are urged under the influence of the spring 70 to the position shown in Fig. 5 of the drawings. Also by this means the rod 44 and the resilient cam plate 40 are moved to the right and to the position as viewed in Fig. 5.

The film reel 22 thus comprises a film $f$ coming from the supply spool 23 guided over the guide rolls 54 and 56 and being taken up on the takeup or winding spool 25. The film in and the operated parts on the magazine M normally assume the position shown in Fig. 5; and during a projection and film winding operation the parts assume this position as shown in Fig. 5, and the film is fed in the magazine being taken off the supply spool, guided around the rolls 54 and 56, and wound on the takeup spool, all as shown by the various film associated arrows shown in Fig. 2 of the drawings.

This film magazine M is removably receivable in the carrier C and for anchoring the magazine to the carrier the magazine is formed in its side walls 51 and 53 with the rod receiving grooves 55 and 57. The inventive features in this film magazine M are being separately claimed in my copending application Serial No. 536,345, filed May 19, 1944.

The optical projection system P as shown in Figs. 1 and 2 comprises a source of illumination 72 in the form of a lamp fitted to a socket 73 mounted in a bracket 74 on the housing and frame F, a condensing system 76 fitted in a tube 78 of the frame, arranged on one side of a magazine M in projection position, and a transparent medium 94 (which, as will be described below, comprises the film driving or feeding element), a reflector 82 arranged adjacent the main shaft 84 of the machine, a projection lens 83, and an adjustable reflector 86 mounted in a suitable part of the frame F, arranged on the opposite side of the magazine M. By means of this projection system, light from the source 72 is projected through the opening 16 in the magazine M (the magazine in projection position) is incident upon and transmitted through the guided film portion in the line of projection, is then transmitted through the medium 94 and projected by the lens 83 and reflected by means of the reflectors 82 and 86 to a selenium cell or other photosensitive unit (not shown) by means of which the light is converted to electrical sound impulses.

The film drive and rewinding mechanism O shown in assembly in Figs. 1 to 3 of the drawings, functions to feed or drive the film $f$ in the magazine and wind the film on the takeup spool thereof during a projection run, and to rewind the film on the supply spool after a projection run, this mechanism functioning similarly for each of the magazines M on the carrier C.

This mechanism O comprises in its essential parts a driving element in the form of a circular drive plate 88 to which is coaxially fixed by means of the flanged disc 90 and the securing elements 92, the film driving member 94 above referred to which is in the form of a drum and more particularly in the form of a transparent such as a glass annulus. The drive plate 88 and the annular drum 94 are rotatably mounted by means of the ball bearing 96 about a shaft 98 fixed to the central post 100 of the machine, which latter is secured to a suitable part 102 of the machine casing and frame F. This drive plate and annular drum (88 and 94) are adapted to be continuously rotated in the operation of the machine (when the motor is energized) in the direction indicated by the arrow $b$ in Fig. 1 of the drawings. It will be noted at this point that the direction of rotation of the drive plate and its annular drum is opposite to the direction of rotation of the carrier C indicated by the arrow $a$ in Fig. 1.

Each film magazine M has three different operative phases. During a projection run the film in the selected magazine (the magazine within the projection system P) is driven or fed by the annular drum 94 and is wound on the take-up spool by means of the takeup spindle 26. After a projection run and during the movement of a film magazine M out of projection position, the film in such magazine is rewound on its supply spool by means of the supply spool spindle 24. The third operative phase is when the film magazine is out of projection position but stationary as during a dwell period of the carrier C when some other selected magazine is in projection position. In the last mentioned phase the film in such magazine M is neither being wound nor rewound. For all of these three phases, two dynamic and one static, the drive plate 88 and its annular drum 94 are rotated continuously in the arrowed direction $b$. It is to accomplish these three operative phases of each magazine M during the continued or maintained rotation of the operating mechanism O that each magazine is provided with the spool drives 36 and 38 and the means for operating the same comprising the cam plate 40 and the operating rod 44.

For operating the cam plate 40 through its operating rod 44 for each of the magazines, there is provided a cam 110 fixedly mounted on a stepped part of the central shaft 84 and arranged concentrically or coaxially with the drive plate 88 and the annular drum 94. The cam 110 is provided with three cam faces preferably arranged peripherally on the cam and consisting of a deep groove 118, five shallow grooves 120, 120 spaced about the cam, and intermediate peripheral faces 122, 122 (see particularly Fig. 4). The deep groove 118 is located in the vertical plane of the projection system, while the shallow grooves 120, 120 are arranged in the medial vertical planes of the other five magazines M, M which are out of projection position (when the carrier is in a dwell condition). The action of the cam 110 is translated by means of a cam follower 124 associated with each of the magazines M into the movement of its rod 44, the inner flanged end of the cam follower 124 engaging the circular disc end 64 of the operating rod 44 (one for each magazine).

The three operative phases above described for each magazine are produced by the action of the cam 110 and the cam follower 124 and the operation by the cam follower (for each magazine) of the film takeup and rewinding drives of the magazine. These three operations of the cam are best depicted in Fig. 4 of the drawings. In the operation of the carrier C each cam follower 124 assumes each of the positions $a'$, $b'$ and $c'$, these being respectively the projection position of a film magazine, the movement from projection position of the magazine as when the carrier is rotated in the direction $a$ of Fig. 4, and the stationary out of projection position of the film magazine. In the projection position the cam follower 124 (influenced by the double loop spring 70 of its magazine) is moved into the deep groove 118 of the cam 110; during rotational movement of the carrier and the magazine the cam follower 124 rides over the cam face 122 in the position $b'$; and during a dwell period of the carrier with the magazine out of projection position the cam follower 124 is located in an intermediate position determined by any one of the five shallow cam grooves 120, 120.

The main drive plate 88 is formed circumferentially near its periphery and on its inner face with an annular depression 126. The rim part of the plate 125 on the inside of this depression and the rim part of the plate 127 on the outside of this depression form contact faces engageable respectively by the spool drives 36 and 38 of each magazine M. It will be noted that the rim part 125 lies in a plane slightly elevated with reference to the plane of the rim part 127. When any spool spindle 24 of the magazine is moved axially outwardly, its wheel or disc frictionally engages the rim part 125 of the driving plate 88, and when any spool spindle 26 is moved axially outwardly, its drive wheel 38 engages the rim part 127 of the driving plate. The first mentioned engagement is on one side of the spool axis, whereas the second mentioned engagement is on the other side of the spool axis, whereby the continuous rotation in the direction b (Fig. 1) of the driving plate 88 will be utilized either for the winding of the film on the takeup spool (the engagement with the drive wheel 38) or the rewinding of the reel on the supply spool (the engagement of the drive wheel 36). It will be noted that the radial width of the depression 126 permits the engagement of the wheel 36 on only one side of its axis, and the relative elevation of the rim part 125 permits the engagement of the wheel 38 on only one side of its axis, namely, the opposite side. These relations are best depicted in Fig. 1 of the drawings. By means of this construction the rotation of the driving plate 88 in one direction will thus serve to effect the winding of the magazine film (during a projection run) and the rewinding of the film (after a projection run).

The film f in the magazine is fed or driven by the engagement of the central guided strip of the film with the periphery of the annulus or drum 94, and only when a film magazine is in a projection position. Under the conditions particularly shown in Figs. 2 and 5 of the drawings, the film f influenced by the action of the spring 70 is in engagement with the constantly rotating transparent drum 94 and is thereby fed through the optical projection system. At this time the cam follower 124 (also acted upon by the spring 70 by way of the rod end 64) is located in the deep groove 118 of the cam 110. In this operative position the spring cam plate 40 is in the position depicted in these figures, the wing 52 thereof having engaged and moved the spool spindle 26 into a position where its drive wheel 38 has contacted or engaged the driving plate 88. Thus in this position the film f is being fed or driven by the transparent annulus 94 and is being taken up or wound on the takeup spool. It will be noted that when the drive disc 38 is moved into this position into engagement with the driving plate 88, the rewinding drive disc 36 is at the same time moved out of engagement with the driving plate, this being due to the position assumed by the cam plate wing 50 and by the then freedom of axial movement of the spool spindle 24.

In this position as aforesaid, the light beam of the optical system is projected through the magazine and the moving film, thence through the rotating transparent annulus 94, and is thence reflected to the selenium and other light sensitive cell.

When the magazine M is moved out of its projection position by rotation of the carrier C, the cam follower 124 of the magazine is moved through its b' position (Fig. 4). This causes the rod 44 and all the parts associated therewith to move outwardly radially, thereby causing the disengagement of the guided portion of the film f from its driving annulus 94 (the guide plates 58 and 60 being moved inwardly about the pivot pin 66) and simultaneously causing the spring cam plate 40 to move to its other extreme position. The driving drum 94 may, therefore, continue its rotation without driving or feeding the film in the magazine, and the cam wing 50 now being moved into engagement with the spool spindle end 34 while the wing 52 is moved out of engagement with the spool spindle end 37, the drive wheels 36 and 38 will be moved outwardly and inwardly respectively, whereby the takeup wheel is free to disengage from the drive wheel 88 and the supply or rewinding wheel is engaged with the drive plate for rewinding the film. It will be noted that both drive wheels 36 and 38 are arranged at substantial radii from the axis of rotation of the system (represented by the post 100), and it will be also noted that the rewinding wheel 36 is substantially smaller in diameter than the winding or takeup wheel 38. Thereby both the winding and rewinding spools are rotated at the desired speeds, with the rewinding effected in a shorter interval of time.

When a magazine M is in one of the dwell positions outside of the projection system (as during the projection run of another magazine), the cam follower 124 is in one of its c' or intermediate positions (Fig. 4). In this intermediate position the guided portion of the film f is still out of contact with the peripheral face of the driving drum 94 and the spool drive wheels 36 and 38 are both disengaged from the driving plate 88. Thereby the driving plate 88 and the driving drum 94 may be continued in their rotation without driving, winding or rewinding the film in any of the magazines which are out of projection position.

The magazine carrier C may comprise simply a gear wheel 130 rotatable about an enlarged portion 132 of the central shaft 84, the gear wheel having the peripheral teeth 134 and a plurality such as six extending anchor rods 136, 136 threaded at their outer ends and provided with the knurled nuts 138, the said anchor rods being attached to the gear wheel 130 by having the inner bent ends of the rods 140 inserted in holes 142 in the gear wheel. The gear wheel 130 is held between the cam 110 and a part 144 of the frame, to which frame part the shaft 84 is fixed by means of a pin 146 (see Fig. 2). It will be noted that the cam 110 and the shaft enlargement 132 are formed with registering openings 148 for the reflected light projection beam (see Fig. 2). The magazines M, M are thus readily assembled in position on the carrier C by inserting the magazines in position on the gear wheel 130 when the knurled nuts 138 are in their outermost position (see Fig. 5), the anchor rods 136 being received by the magazine casing grooves 55 and 57. All of the magazines are then locked in abutting relation on the magazine simply by inward movement of the knurled nuts 138 to the position as best shown in Figs. 1 and 5 where these nuts engage a shouldered part of the magazine casings. It will be noted that each anchor rod serves for the adjacent sides of two adjacent magazines. The anchor rods are preferably arranged in or near the plane of the cam operated rods 44, 44.

The mechanism for operating the carrier C and the operating means O comprises a motor 150 and means connecting the motor to operate the driving mechanism O continuously and the carrier C with dwell and moving periods, the driving or operating means O and the carrier C coaxially arranged about the central post 100 being rotatable in opposite directions. It may be noted at this point that the rotation of the carrier, namely, the gear wheel 130, and the operating means, namely, the drive plate 88 (and the annular drum 94) in opposite directions produces a more rapid rewinding of the film in the magazines, thereby also serving for any given machine rewinding of a film having a substantial length.

For continuously driving the drive plate 88, I provide a wheel 152 fixed to one end of a shaft 154 engaging a wheel 156 fixed to the shaft of the motor 150, the wheel 152 being formed with a conical portion 158 mating with the embossment formed by the depression 126 in the drive plate 88. This frictional drive connection between the motor and the drive plate 88 is simple and also preferable for the purpose.

The carrier gear 130 is connected to be operated from the shaft 154 through the clutching system best shown in Figs. 10 to 13 of the drawings. In the organized machine this clutching system is automatically controlled and for the purpose of the invention described in this application, a manual control of the clutching system may be assumed. The shaft 154 is connected to continuously rotate a star wheel 160 fixed to a shaft 162 by means of the following gear drive: worm 164 fixed to the shaft 154, worm wheel 166 on the shaft 168, worm 170 and worm wheel 172 fixed to the star wheel 160 and its shaft 162. On the shaft 162 is rotatably mounted a plate or disc 174 to which is splined a pinion 176, the latter meshing with the teeth 134 of the carrier gear wheel 130. To the plate 174 is pivoted a dog or ratchet 178 influenced by a plate carried spring 180, the tooth of the dog 178 being adapted to be engaged by the star wheel 160 and adapted to be disengaged therefrom. The engaged position is shown in Fig. 11 and the disengaged position in Fig. 10. When engaged, the rotation of the star wheel in the arrowed direction shown in Fig. 11 causes the rotation of the carrier gear 130 in the arrowed direction shown in this figure. When disengaged, the star wheel continues its rotation in the arrowed direction shown in Fig. 10, without, however, causing a rotation of the carrier gear 130.

The rotating and dwelling periods of the carrier gear 130 are shown here to be manually controllable by the clutching and unclutching of the dog 178 and star wheel 160 accomplished by the following unlatching mechanism comprising: a pivoted arm 182 provided with a pin 184 and a stud 186, the pin 184 being adapted to be moved between the positions shown in Figs. 10 and 11 by causing the stud to be moved between the two positions shown in Figs. 10 and 11 operated by a cam slot 188 formed in a cam lever 190 which is actuated by means of a connecting rod 192, the cam lever being fulcrumed about the shaft 162. Reciprocating movement of the connecting rod 192 will thus cause the arm 182 to move between the two positions referred to. In the position shown in Fig. 10 the pin 184 is interposed in the path of rotation of the dog 178 thereby lifting this dog out of the star wheel and thereby stopping the operation of the carrier in a dwell position while permitting the star wheel to continue its rotation. Movement of the pin 184 to the position shown in Fig. 11 removes the same from the dog 178 and permits the dog under the influence of the spring 180 to engage the star wheel whereupon the carrier gear and the carrier are set into rotation.

The use and operation of the projection machine of my present invention and the many advantages thereof will be fully apparent from the above detailed description. It will be noted particularly that the many functions required to be accomplished by the machine are achieved by exceedingly simple equipment. The main drive for feeding, winding and rewinding the film simply consists of a light weight circular plate and a drum which forms part of the optical system. The operated parts for film winding and rewinding are carried by and form a unit with the film magazine, of which the parts are exceedingly simple. The connections between the film spools (their drives) and the driving plate are both structurally and operationally unique and of a simple nature. The carrier itself comprises mainly a light weight gear wheel; and the carrier and the operating drive are moved in desired relation by mechanism which may be easily controlled. All of the parts present in combination a compact and efficiently organized arrangement so that the main purpose of the invention is achieved. All of the parts are readily accessible thereby permitting ready assembly and disassembly.

It will be obvious that while I have described my invention in preferred form, many changes may be made therein without departing from the spirit of the invention defined in the following claims.

I claim:

1. A film projection machine comprising a rotatable magazine carrier, a film magazine positioned in a sector of said carrier, said film magazine being provided with a takeup spool drive and a rewinding spool drive, the said carrier being rotatable to a position in which the film magazine is in a position for a projection run and being rotatable to move the film magazine away from such projection position, a rotating driving element, means for causing the takeup spool drive and said rotating driving element to engage for the winding of the film in the magazine during a projection run, and means for causing the rewinding spool drive and said rotating driving element to engage for the rewinding of the film in the magazine during movement of the film magazine away from projection position, said take-up and rewinding spool drives being movable to disengaged position when not effectively acted upon by said means.

2. The film projection machine of claim 1 in which a plurality of film magazines each provided with a takeup spool and a rewinding spool are positioned on and circumferentially about the carrier whereby upon rotation of the carrier each of the film magazines is movable into and out of projection position, and in which the said means is provided for the takeup and rewinding spool drives of each of said magazines.

3. A film projection machine comprising a rotatable magazine carrier, a film magazine positioned in a sector of said carrier, said film magazine being provided with a takeup spool drive and a rewinding spool drive, the said carrier being movable to a position in which the film magazine is in a position for a projection run and being rotatable to move the film magazine away from such projection position, a driving element, means for rotating the driving element, means for moving the spool takeup drive into engagement with the driving element for winding the film during a projection run and means for moving the rewinding spool drive into engagement with the driving element for rewinding the film when the said carrier is rotated to move the magazine out of projection position.

4. The film projection machine of claim 3 in which a plurality of film magazines each provided with a takeup spool and a rewinding spool are positioned on and circumferentially about the carrier whereby upon rotation of the carrier each of the film magazines is movable into and out of projection position, and in which the said means is provided for the takeup and rewinding spool drives of each of said magazines.

5. The projection machine of claim 1 in which the driving element comprises a plate and in which the takeup and rewinding spool drives each includes a wheel, each wheel being movable into and out of engagement with said drive plate.

6. The projection machine of claim 3 in which the driving element comprises a plate and in which the takeup and rewinding spool drives each includes a disc wheel, each disc wheel being movable into and out of frictional contact with said drive plate.

7. A film projection machine comprising a rotatable magazine carrier, a film magazine positioned in a sector of said carrier, said film magazine being provided with a takeup spool drive and a rewinding spool drive, the said carrier being rotatable to a position in which the film magazine is in a position for a projection run and being rotatable to move the film magazine away from such projection position, a rotating driving element, means for causing the takeup spool drive and said rotating driving element to engage for the winding of the film in the magazine during a projection run, means for causing the rewinding spool drive and said rotating driving element to engage for the rewinding of the film in the magazine during movement of the film magazine away from projection position, said take-up and rewinding spool drives being movable to disengaged position when not effectively acted upon by said means, and mechanism for operating both of said last mentioned means to selectively produce the takeup drive engagement and the rewinding drive engagement.

8. A film projection machine comprising a rotatable magazine carrier, a plurality of film magazines each provided with a takeup spool drive and a rewinding spool drive positioned circumferentially on said carrier, rotation of said carrier being effective to bring each magazine to a fixed position for a projection run and to move such magazine away from such projection position, a rotatable driving element, means for each of the magazines for causing its takeup spool drive and said driving element to engage for the winding of the film in the magazine during a projection run, means for each of the magazines for causing its rewinding spool drive and said driving element to engage for the rewinding of the film in the magazine during movement of such magazine away from its projection position, said take-up and rewinding spool drives being movable to disengaged position when not effectively acted upon by said means, and mechanism for operating both of said last mentioned means effective for each magazine to selectively produce the takeup drive engagement during a projection run and the rewinding drive engagement during movement of the magazine away from projection position.

9. The projection machine of claim 8 in which the driving element is a rotatable circular drive plate, the spool drives for each magazine include drive wheels, in which such drive wheels are both located at one side of and at substantial radii from the axis of rotation of the drive plate, and in which the rewinding drive wheel is substantially smaller in diameter than the takeup drive wheel.

10. The projection machine of claim 8 in which the driving element is a rotatable circular drive plate, the spool drives for each magazine include drive wheels, and in which the engagement between the driving plate and the takeup drive wheel is on one side of the axis of such wheel, while the engagement between the driving plate and the rewinding drive wheel is on the other side of the axis of such latter wheel.

11. The film projection machine of claim 8 in which the magazine carrier and the driving element are coaxially arranged.

12. The film projection machine of claim 8 in which the magazine carrier and the driving element are coaxially arranged and are rotatable in opposite directions.

13. The film projection machine of claim 8 in which the said mechanism includes a cam member arranged coaxially with said carrier.

14. The film projection machine of claim 8 in which the said mechanism includes a peripheral cam wheel, and in which the magazine carrier, the driving element and the said cam wheel are all arranged coaxially.

15. A projection machine comprising a rotatable driving plate, a rotatable magazine carrier and a cam member, all arranged coaxially, a plurality of film magazines each provided with a takeup spool drive and a rewinding spool drive positioned on and around said carrier, rotation of said carrier being effective to bring each magazine to a fixed position for a projection run and to move such magazine away from such projection position, and mechanism operated from said cam member for causing the takeup spool drive for each of said magazines to engage the driving plate for the winding of its film during a projection run and for causing the rewinding spool drive for each of said magazines to engage the driving plate for the rewinding of its film during movement of such magazine from projection position, said take-up and rewinding spool drives being movable to disengaged position when not effectively acted upon by said mechanism.

16. The projection machine of claim 15 in which the driving plate and magazine carrier are rotatable in opposite directions.

17. In combination with the projection machine of claim 15, a film engaging driving drum fixed to and coaxial with said driving plate, and means effective only when each magazine is in projection position for causing the film in said magazine to engage and be fed by the driving drum.

18. In combination with the projection machine of claim 1, a film engaging driving means fixed to and rotating with the driving element, and means effective only when the magazine is in projection position for causing the film to engage the film driving means.

19. A projection machine comprising a rotatable driving plate, a rotatable magazine carrier, both arranged coaxially, a plurality of film magazines each provided with a takeup spool drive and a rewinding spool drive positioned on and around said carrier, rotation of said carrier being effective to bring each magazine to a fixed position for a projection run and to move such magazine away from such projection position, and mechanism for causing the takeup spool drive for each of said magazines to engage the driving plate for the winding of its film during a projection run and for causing the rewinding spool drive for each of said magazines to engage the driving plate for the rewinding of its film during movement of such magazine from projection position, said take-up and rewinding spool drives being movable to disengaged position when not effectively acted upon by said mechanism.

20. In combination with the projection machine of claim 19, a film engaging driving drum fixed to and coaxial with the driving plate, and means effective only when each magazine is in projection position for causing the film in said magazine to engage and be fed by said drum.

21. For a projection machine, a rotatable film magazine carrier, a rotatable driving plate for winding and rewinding the film in the magazine, and a rotatable drum fixed to said driving plate for feeding the film in the magazine, all arranged in coaxial relationship.

22. For a projection machine, a rotatable film magazine carrier, a rotatable driving plate for winding and rewinding the film in the magazine, a rotatable drum fixed to said driving plate for feeding the film in the magazine, a circular cam for controlling the winding, rewinding and feeding of the film, all arranged in coaxial relationship.

23. The sub-combination of claim 21 in which the driving plate and the carrier are arranged to be rotated in opposite directions.

24. For a projection machine, a rotatable magazine carrier, a film magazine provided with a takeup spool drive and a rewinding spool drive positioned in a sector of said carrier, a rotatable driving element, a cam member, the carrier, driving element and cam member being arranged coaxially, mechanism operated from said cam member for causing the takeup and rewinding spool drives to engage the driving element, said takeup and rewinding spool drives being movable to disengaged position when not effectively acted upon by said mechanism, said cam member having three cam faces, one for causing the takeup spool drive to engage the driving element, another for causing the rewinding spool drive to engage the driving element, and the third for permitting both spool drives to disengage the driving element.

25. In the projection machine of claim 1, a motor, means connecting the motor to the driving element to continuously rotate the same, and means connecting the motor to the carrier to rotate the same to a film projection position, permit the same to dwell for a projection run and then rotate the same away from the projection position.

FREEMAN H. OWENS.

REFERENCES CITED

The following references are of record in the file of this patent:

UNITED STATES PATENTS

| Number | Name | Date |
| --- | --- | --- |
| 1,245,755 | Mehlfelder | Nov. 6, 1917 |
| 1,614,214 | Steiner | Jan. 11, 1927 |
| 1,618,117 | Tschopp | Feb. 15, 1927 |
| 1,760,219 | Thornton | May 27, 1930 |
| 1,815,693 | DeMadaler | July 21, 1931 |
| 1,933,807 | Hopkins | Nov. 7, 1933 |
| 1,986,053 | Friess | Jan. 1, 1935 |
| 2,196,730 | Hooker | Apr. 9, 1940 |
| 2,196,738 | Nagel | Apr. 9, 1940 |
| 2,200,681 | Rollings | May 14, 1940 |
| 2,227,259 | Hokanson | Dec. 31, 1940 |
| 2,234,697 | Hickman | Mar. 11, 1941 |
| 2,290,071 | Rinaldy | July 14, 1942 |
| 2,318,118 | Warner et al. | May 4, 1943 |

FOREIGN PATENTS

| Number | Country | Date |
| --- | --- | --- |
| 466,446 | Great Britain | May 28, 1937 |